(12) United States Patent
Mogi et al.

(10) Patent No.: US 8,310,593 B2
(45) Date of Patent: Nov. 13, 2012

(54) TELEVISION APPARATUS

(75) Inventors: Hisashi Mogi, Fukaya (JP); Mitsuaki Moritani, Musashino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/186,354

(22) Filed: Jul. 19, 2011

(65) Prior Publication Data

US 2012/0050615 A1 Mar. 1, 2012

(30) Foreign Application Priority Data

Aug. 26, 2010 (JP) ................................. 2010-189845

(51) Int. Cl.
*H04N 5/46* (2006.01)
*H04N 3/27* (2006.01)

(52) U.S. Cl. ........ 348/552; 348/554; 348/553; 348/705; 348/706; 725/110

(58) Field of Classification Search ................. 348/554, 348/552, 553, 705, 706; 725/110, 121, 141, 725/133
See application file for complete search history.

(56) References Cited

U.S. PATENT DOCUMENTS

| | | | |
|---|---|---|---|
| 6,073,171 A * | 6/2000 | Gaughan et al. | ............... 725/110 |
| 6,348,932 B1 | 2/2002 | Nishikawa et al. | |
| 7,174,397 B2 | 2/2007 | Tomiyasu | |
| 7,454,777 B1 * | 11/2008 | Nishikawa et al. | ............ 725/151 |
| 7,600,081 B2 | 10/2009 | Sutardja | |
| 7,761,668 B2 | 7/2010 | Sutardja | |
| 2004/0212607 A1 | 10/2004 | Tomiyasu | |
| 2007/0168622 A1 | 7/2007 | Sutardja | |
| 2009/0066706 A1 | 3/2009 | Yasue et al. | |
| 2010/0023705 A1 | 1/2010 | Sutardja | |

FOREIGN PATENT DOCUMENTS

| | | |
|---|---|---|
| JP | 2001-094966 A | 4/2001 |
| JP | 2002-538735 A | 11/2002 |
| JP | 2004-264588 | 9/2004 |
| JP | 2005-244716 A | 9/2005 |
| JP | 2005-260330 | 9/2005 |
| JP | 2006-318281 | 11/2006 |
| JP | 2007-220085 | 8/2007 |
| WO | WO 00/52927 | 9/2000 |
| WO | WO 01/11873 A1 | 2/2001 |

OTHER PUBLICATIONS

Hatanaka et al. 2010. VX700 Series—The Super Narrow Bezel Internet Capable LED TV with LED Backlighting, 4 pages.
Notice of Reasons for Rejection mailed by the Japan Patent Office on Dec. 13, 2011 in corresponding Japanese Patent Application No. 2010-189845.

* cited by examiner

*Primary Examiner* — Jefferey Harold
*Assistant Examiner* — Jean W Desir
(74) *Attorney, Agent, or Firm* — Knobbe Martens Olson & Bear LLP

(57) ABSTRACT

According to one embodiment, the apparatus has a first block configured to be connected to a receiving block for a television signal and a second block independent from the first block, configured to be connected to a network. A bypass route is configured to lead a bypass stream including an image signal from the first block to the second block. A processor is configured to generate a return stream by inserting the image signal from the network into the image signal on the bypass stream, at the second block. A return pass is configured to return the return stream to the first block. And a converter is configured to convert the image signal included in the return stream into a signal for output and display, at the first block.

9 Claims, 8 Drawing Sheets

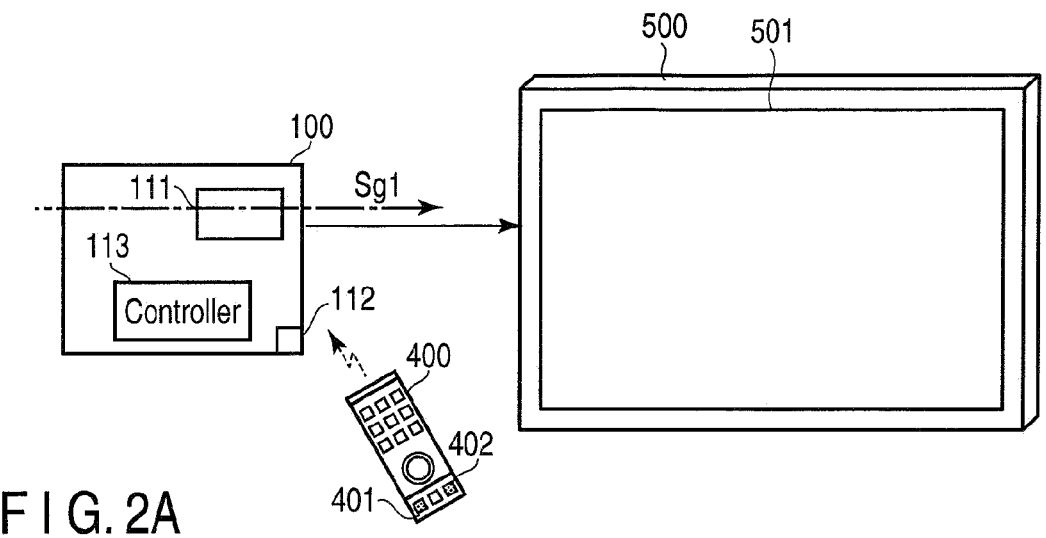
F I G. 2A
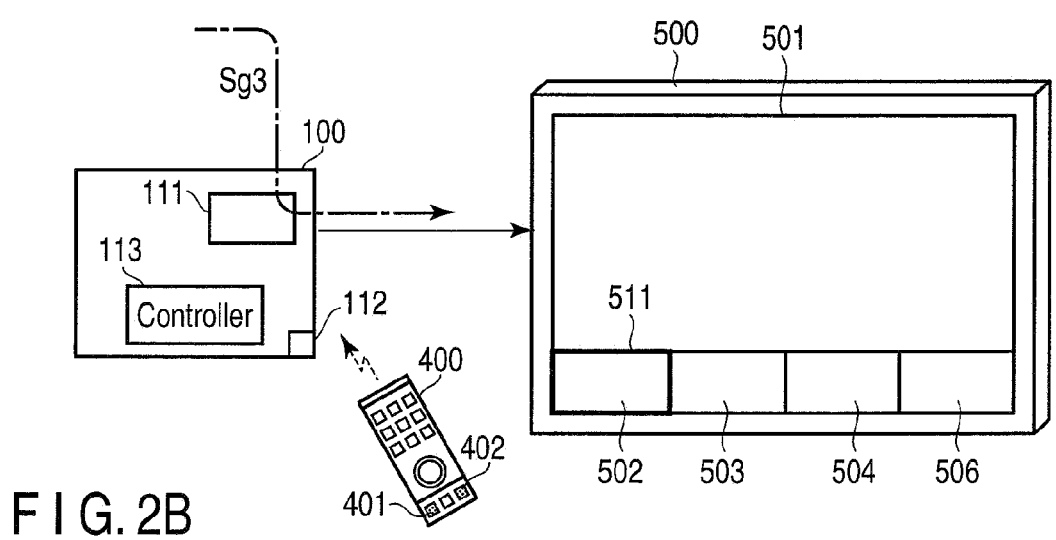
F I G. 2B
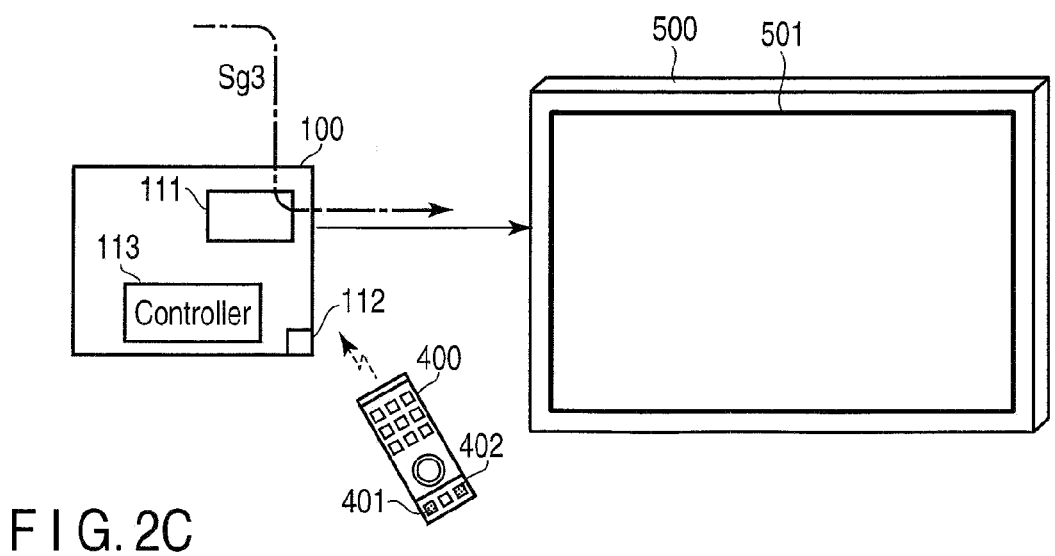
F I G. 2C

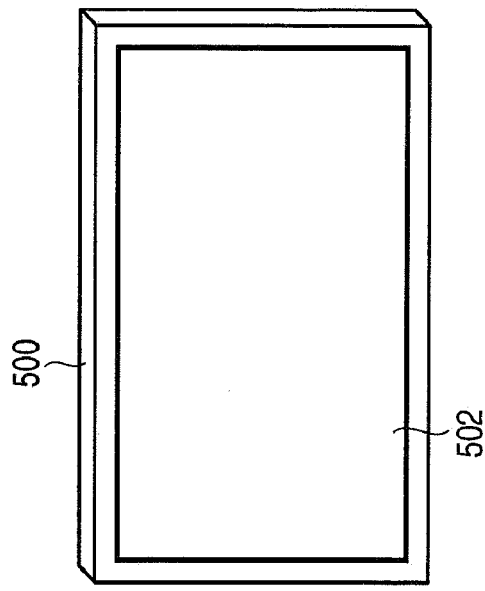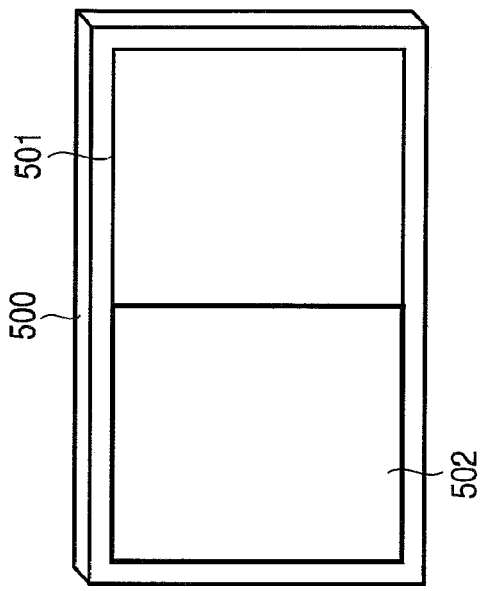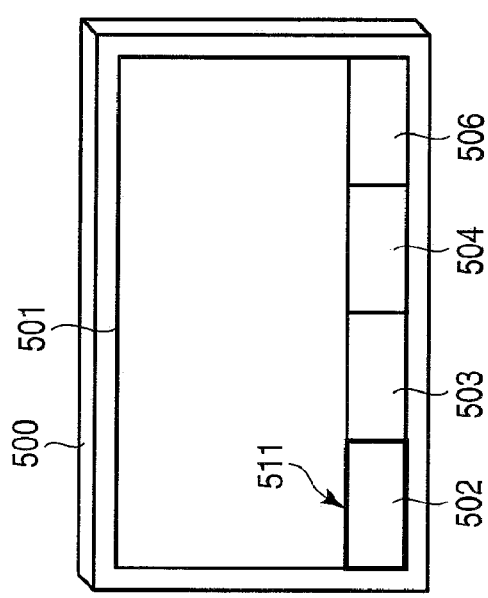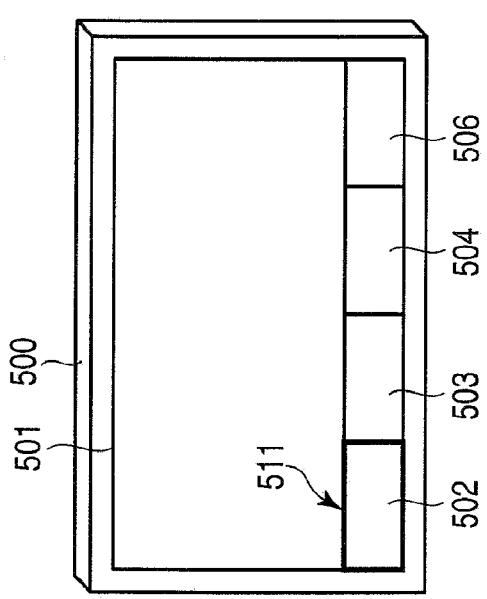
F I G. 3A
F I G. 3B

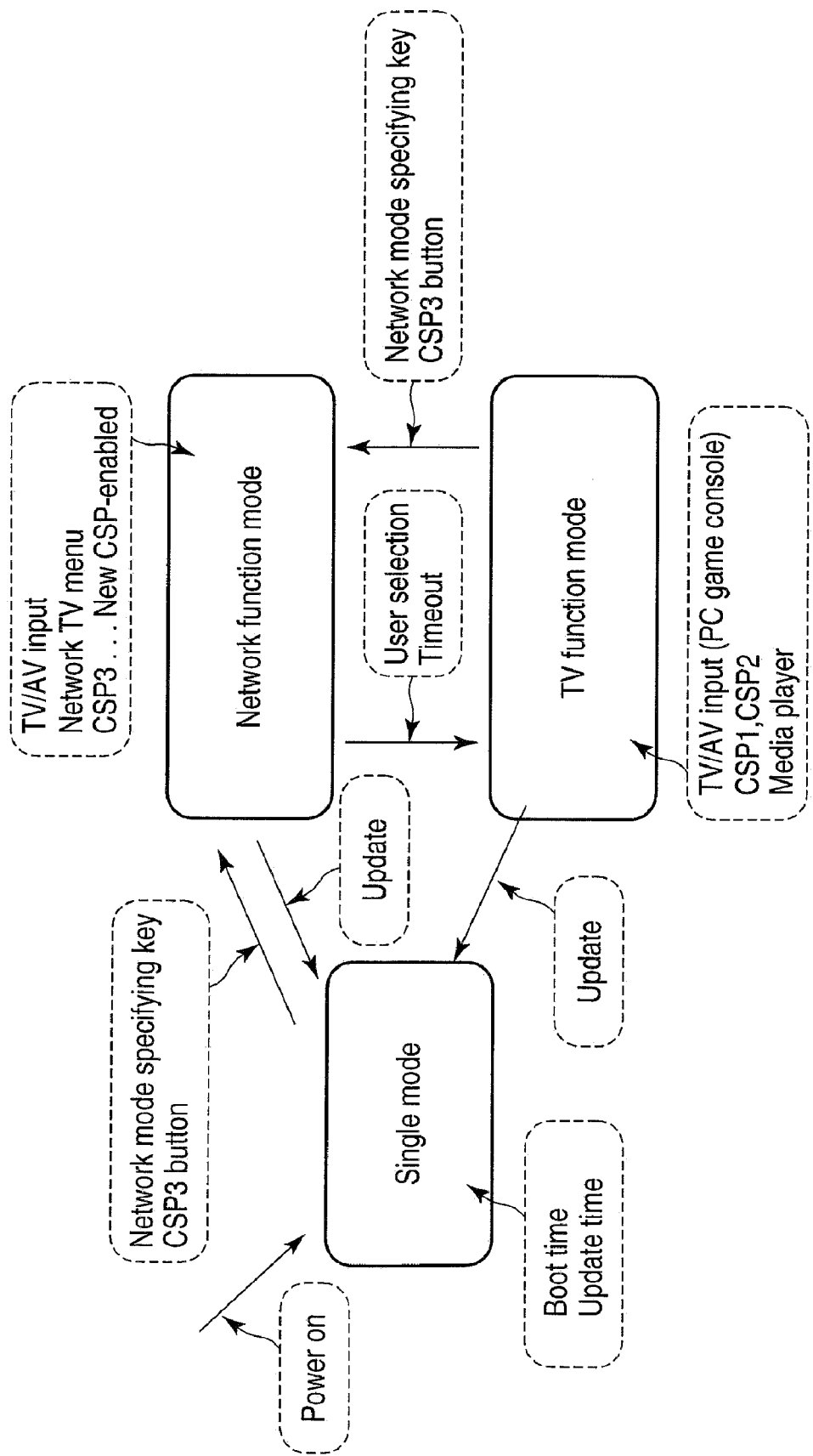
F I G. 4

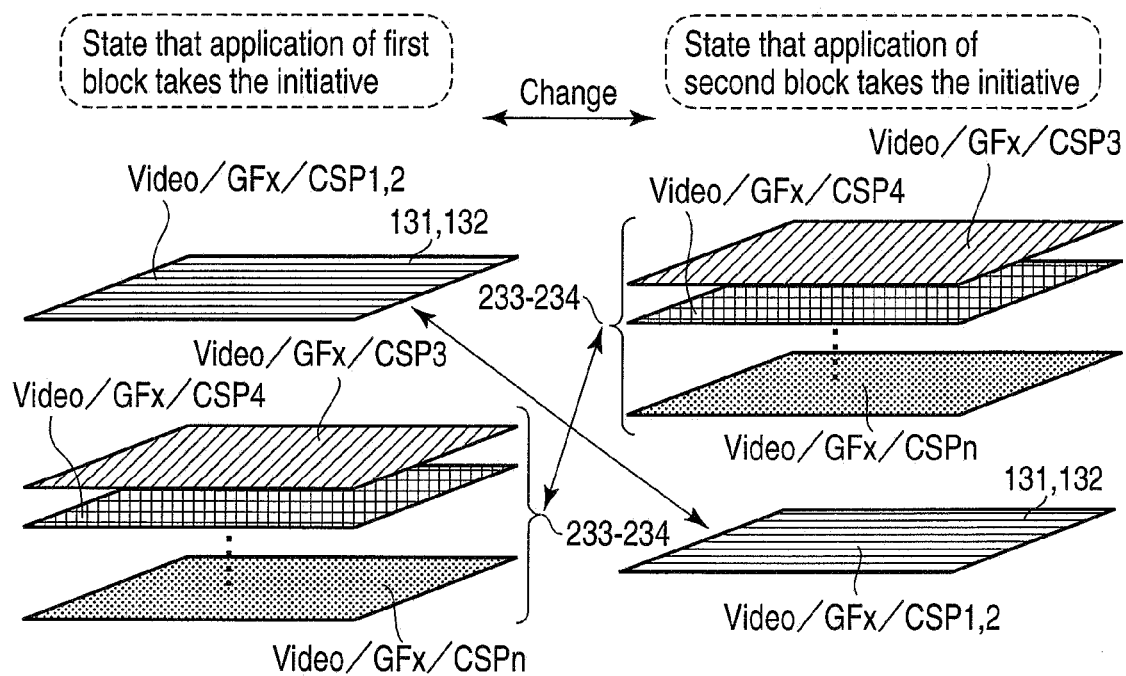
F I G. 5B

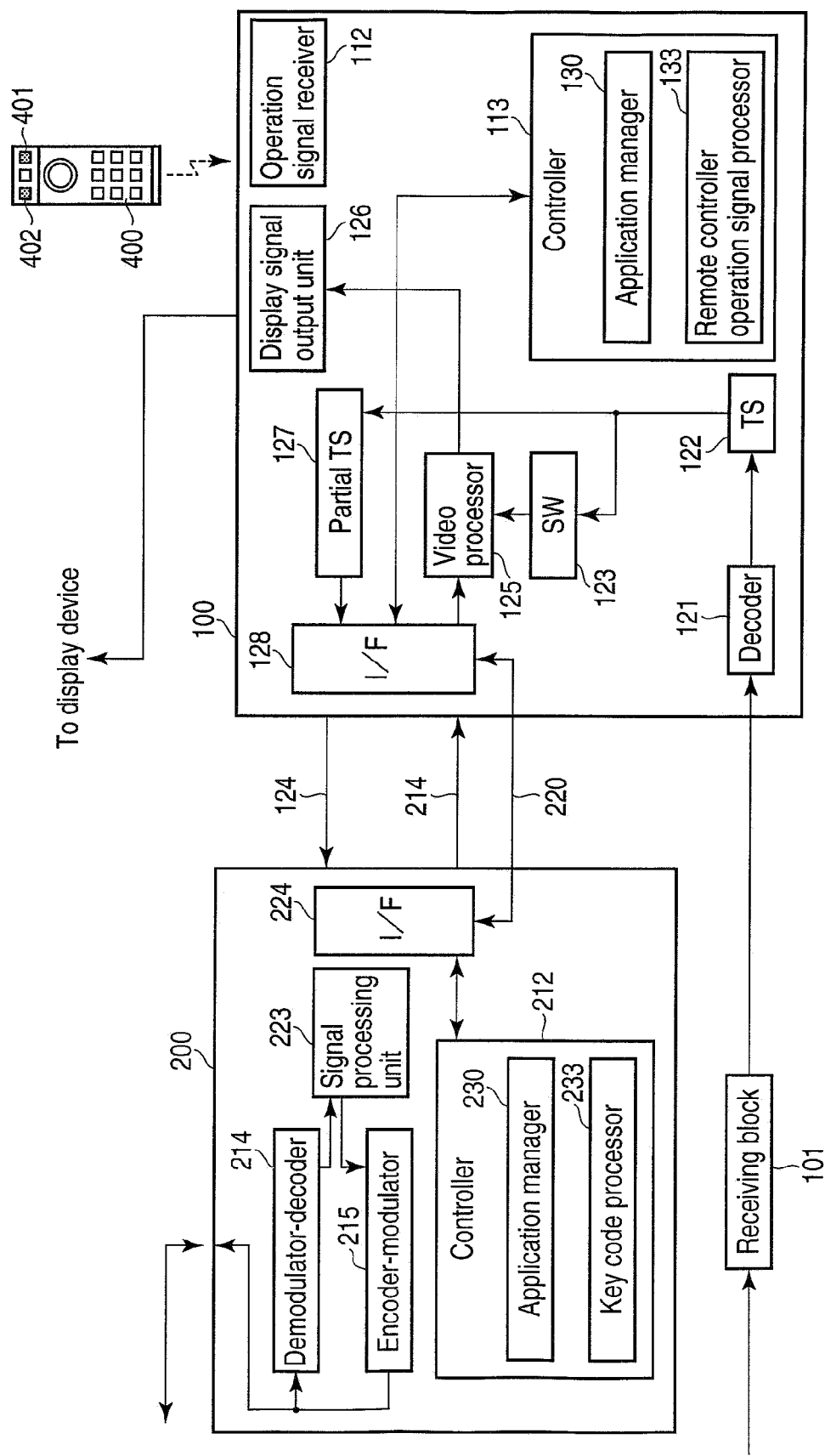
F I G. 6

TELEVISION APPARATUS

CROSS-REFERENCE TO RELATED APPLICATIONS

This application is based upon and claims the benefit of priority from Japanese Patent Application No. 2010-189845, filed Aug. 26, 2010 the entire contents of which are incorporated herein by reference.

FIELD

Embodiments described herein relate generally to a television apparatus.

BACKGROUND

A recent television apparatus is connectable to the Internet, and able to acquire moving picture data via the Internet. This kind of television apparatus is called a net television (TV).

In the foregoing television apparatus, there is a need to perform a processing of changing data from a different signal source and supplying it to a display unit. For this reason, a technique of processing the foregoing data from a different signal source using an independent block has been developed. For example, a conventional technique develops the following apparatus. The apparatus is configured so that a computer data processing system and a system for processing a reproducing signal from a DVD reproducing apparatus are independently operable.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIGS. 2A, 2B and 2C are exemplary views showing images of a display device and signal routes when the television apparatus according to an embodiment shown in FIG. 1 is operated;

FIGS. 3A and 3B are exemplary views showing other images of a display device when the television apparatus according to an embodiment shown in FIG. 1 is operated;

FIG. 4 is a view to explain a classification of an operating mode of the television apparatus according to an embodiment shown in FIG. 1;

FIG. 5B is a view to explain an application order when applications included in the first block is started in a state of taking the initiative and an application order when applications included in the second block is started in a state of taking the initiative;

FIG. 6 is an exemplary block diagram showing the configuration of a part of first and second blocks;

DETAILED DESCRIPTION

Various embodiments will be described hereinafter with reference to the accompanying drawings.

Recently, content service providers (CSPs) that provide content such as moving picture data, news programs, miscellaneous economic information and movies are increasing in number. These providers each make a request of an independent content providing topology, for example, an image display topology (layout).

However, in a television apparatus, it is not cost-effective to change and add applications of an image display topology every when the number of provides increases. This is based on the following reason. Namely, a heavy load is placed on an internal control program because the television apparatus executes demodulation, decoding, image and audio processing, image quality control and television format conversion processing. In addition to the above, if a new application is added, there is a need to redesign the hardware and software of the entire television apparatus.

In view of the foregoing circumstances, an object of the present invention is to provide a television apparatus, which is configured so that software development is small scale without making great changes to the hardware.

In general, according to an embodiment, a television apparatus comprises: a first block configured to be connected to a receiving block for a television signal; a second block independent from the first block, configured to be connected to a network; a bypass route configured to lead a bypass stream including an image signal from the first block to the second block; a processor configured to generate a return stream by inserting the image signal from the network into the image signal on the bypass stream, at the second block; a return pass configured to return the return stream to the first block; and a converter configured to convert the image signal included in the return stream into a signal for output and display, at the first block.

Figure 1:
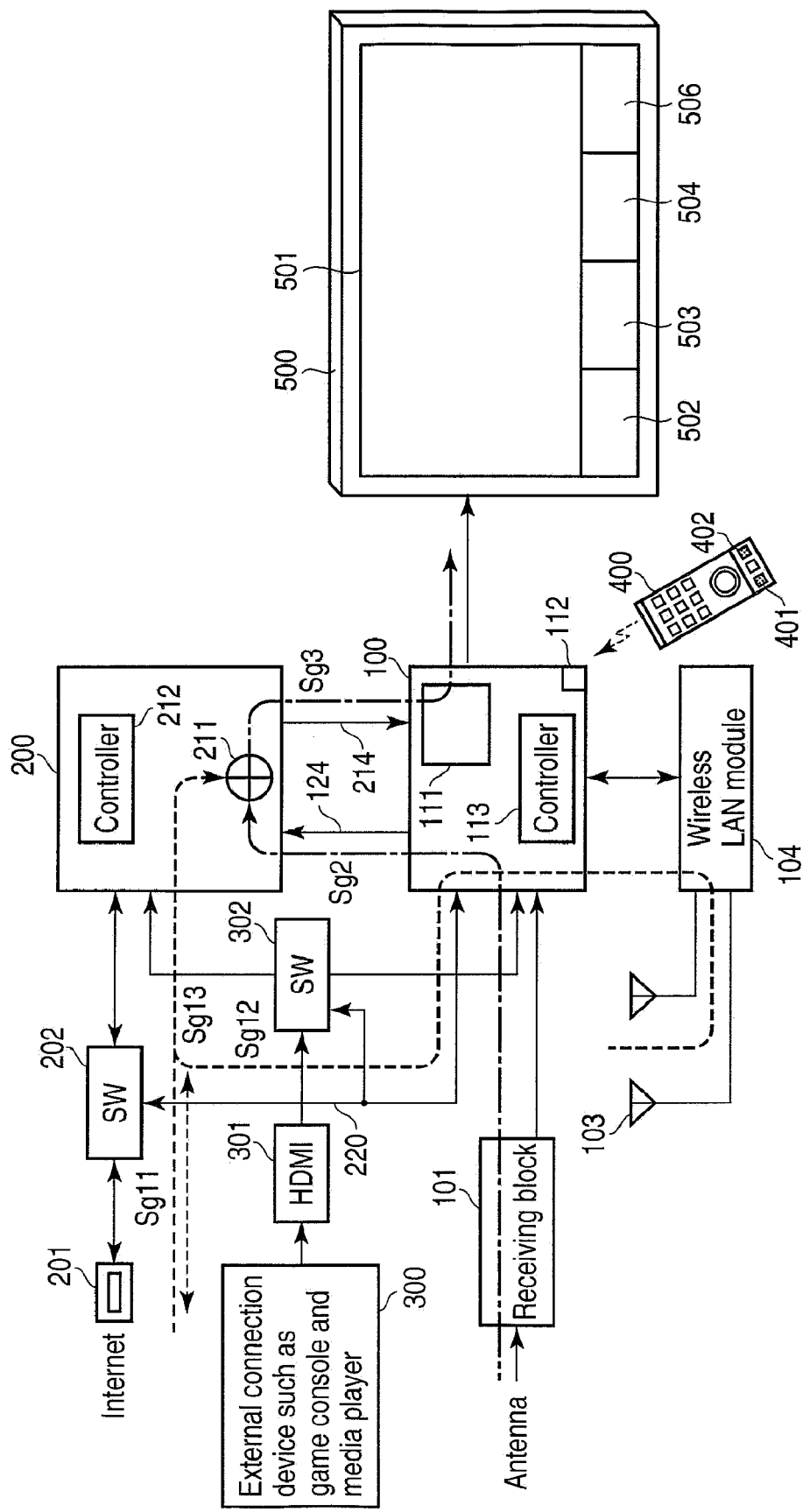
FIG. 1 is an exemplary block diagram showing one example of the configuration of a television apparatus according to an embodiment.

Hereinafter, an embodiment will be described with reference to the accompanying drawings. In FIG. 1, a reference number 100 denotes a first block, which is supplied with a television signal received by a receiving block 101. The first block 100 comprises a semiconductor integrated circuit, which is mounted with a circuit block for processing a television signal. The foregoing semiconductor integrated circuit is referred to as a system-on-a-chip (SoC).

The first block 100 includes a converter 111. The converter 111 decodes a digital television signal, and executes image quality control of a decoded image signal, and further, converts the image-quality-controlled image signal to a display signal. Further, the first block 100 includes an operation signal receiver 112, which receives and processes an operation signal from a remote controller 400. Furthermore, the first block 100 includes a controller 113, which collectively controls the function of the first block 100.

The first block 100 is connected with a wireless LAN module 104. The wireless LAN module 104 is connected with an antenna 103. The first block 100 is able to capture content from external content service providers via the wireless LAN module 104. For example, the foregoing content is moving picture content and news content.

The first block 100 outputs a bypass stream including an image signal. The bypass stream is input to a second block 200 via a bypass route 121. The second block 200 is connected to a connector 201 via a switch 202. The connector 201 functions as a connection connector to an external network, that is, the Internet. Moreover, the second block 200 includes a processor 211. The processor 211 inserts (or multiplexes) an image signal from an external network input via the switch 202 with respect to an image signal from an external network input via the bypass route 121.

An output of the processor 211 passes a return route 214 as a return stream, and then, is sent to the first block 100.

The following two image signals are given as a foregoing image signal from an external network input to the second block 200 via the switch 202. One is an image signal from the Internet input from the connector 201. The other is an image signal captured by means of the wireless LAN module 104. The switch 202 selects any one of the foregoing two image signals, and thereafter, supplies the selected image signal to the second block 200.

The second block 200 includes a controller 212, which collectively controls the block 200. In addition, the foregoing first and second blocks 100 and 200 are able to capture an image signal from an external connection device 300 via a switch 302. For example, a game console, an optical disk, a magnetic disk, a hard disk and a storage medium player such as a semiconductor memory are given as the external connection device 300. An output from the external connection device 300 is supplied to the first or second block 100 or 200 via a High-Definition Multimedia Interface (HDMI) 301 and a switch 302.

The first and second blocks 100 and 200 are associated by means of a control signal route 220. The control signal route 220 transmits a first carrier signal from the first block 100 to the second block 200, and transmits a second carrier signal from the second block 200 to the first block 100.

For example, an operation signal (or control signal or data) acquired by the operation signal receiver 112 of the first block 100 is transmitted to the second block 200 by means of the first carrier signal. Moreover, a control signal (or data) from the second block is transmitted to the first block 100 by means of the second carrier signal. The control signal controls each selection state of switches 202 and 302.

The foregoing bypass route 121, return route 212 and control signal route 220 may be collectively built up by a High-Definition Multimedia Interface (HDMI), for example.

The foregoing apparatus receives a broadcast signal, and then, operates as a digital television apparatus for displaying a video image of a received program. In this case, this apparatus operates as follows. The operation will be described below with reference to FIGS. 2A and 2B. Specifically, a receiving block 101 receives a broadcast program of a channel corresponding to an operation. A broadcast program stream output from the receiving block 101 is input to the converter 111 of the first block 100. In the converter 111, a vide signal included in the stream is fetched using a decoder while controlling the image quality of the decoded image signal, and further, makes a conversion of scanning lines and the number of pixels to output the image signal as a display signal. The output display signal is input to a display device 500, and thereafter, displayed as a video image. FIG. 2A shows a signal route (stream Sg1) in the foregoing operation.

When the user operates a network mode specifying key 401, which is provided on a remote controller 400, the television apparatus is changed to a state capable of viewing content from a content service provider.

A bypass stream including an image signal from the first block 100 is guided to the second block 200 via the bypass route 124. In this case, the image signal is an image signal of a program selected by the receiving block 101. In this way, a stream Sg2 of FIG. 1 is formed in the bypass route 124.

In the second block 200, an image signal acquired via a network is decoded. A controller 212 includes a menu processor, and generates menu image signals related to a plurality of content service providers (CSPs) captured via a network. The controller 212 periodically compresses a part of an image signal sent from each CSP to store it in a memory, and then, supplies the image signal as a menu image signal.

The processor 211 of the second block 200 inserts the foregoing menu image signal to the image signal from the bypass route 124 to generate a return stream Sg3. In this case, stream Sg3 is returned to the first block 100 via a return route 214.

In the first block 100, the converter 111 converts an image signal in the return stream into a display signal, and then, outputs it.

In this way, the display device 500 displays an image 501 of the program received by the receiving block 101 and menu images 502 to 506 given according to a menu image signal created by the second block 200. FIG. 1 and FIG. 2B show an example in which four menu images 502 to 506 are displayed. In this case, when the user operates a scroll key of the remote controller 402, the menu image is scrolled to the left or right direction on a screen; in this way, many menu images are displayable. Namely, the number of content service providers increases, and thereby, the number of menu images increases.

The controller 113 of the first block 100 recognizes whether content corresponding to each of menu images 503 to 506 is acquired via a route of the connector 201 or input via a route of the wireless LAN module 104. For example, the foregoing recognition is possible when the user sets a provider connection access address to an address manager (not shown) included in the controller 113. Namely, it is possible to determine whether a provider provides content to the user via a wireless network or the Internet according to the foregoing access address.

Therefore, when any of menu images 502 to 506 is specified by operating the remote controller, the controller 113 determines an image selection state from the content of a control signal from the remote controller 400. Based on the foregoing determined result, the controller 113 controls the switch 202 so that the switch 202 selects any one of streams Sg11 and Sg12.

Specifically, when the user operates a cursor key (not shown) of the remote controller 402, a cursor is positioned to any one of menu images on a screen of the display device 500. For example, as can be seen from FIG. 2B, a cursor 511 is positioned to the menu image 502. In the foregoing state, when the user operates an enter key, a moving picture or movie or news program 501 provided by the selected content service provider is display on the whole of the screen of the display device as shown in FIG. 2C.

In this case, a moving picture or movie or news program supplied from stream Sg11 or stream Sg12 of FIG. 1 is displayed. In other words, any one of streams Sg11 and Sg12 is selected by the switch 202, and then, input to the second block 200 as a stream Sg13. Thereafter, video data included in stream Sg13 is decoded, and then, input to the processor 211 as an image signal.

In this case, a change or selection is made by the processor 211. The switch 202 is controlled according to a control signal from the first block 100. In this case, a bypass stream from the bypass route 124 is cut on the input side of the processor 211.

Therefore, when the user operates a TV mode specifying key 402 (different from the network mode specifying key 401) provided on the remote controller 400, a bypass stream from the bypass route 124 is input to the processor 211. In the processor 211, menu images 502 to 506 according to menu image signals are displayed in a state of being again inserted to the image 501 of a TV-side image signal (e.g., screen state shown in FIG. 1 or FIG. 2B).

However, when a predetermined time elapses after the user operates the TV mode specifying key 402, menu images 502 to 506 disappear. Then, the image 501 only of the TV-side image signal is displayed on the whole of the screen (i.e., screen state shown in FIG. 2A, in this case, a stream route is a bypass route→processor→return route).

When the user again operates the TV mode specifying key 402 or network mode specifying key 401 of the remote controller 400, the image 501 of the TV-side image signal and menu images 502 to 506 are simultaneously displayed.

When the user operates the TV mode specifying key 402 from the state shown in FIG. 2B, the processor 211 may be changed to an operation of simply passing a bypass stream from the bypass route 124. Then, when the user again operates the TV mode specifying key 402 or network mode specifying key 401, the image 501 of the TV-side image signal and menu images 502 to 506 are again simultaneously displayed.

An operation signal from the remote controller 400 is received by the operation signal receiver 112, and further, recognized by the controller 113 of the first block as described above. The controller 113 determines whether or not an operation signal (control signal) is content to be transferred to the second block 200. If the operation signal is an operation signal to be transferred to the second block 200, the first block 100 multiples the operation signal with a first carrier signal, and thereafter, transmits it to the second block 200. The controller 212 of the second block 200 receives the operation signal, and then, reflects the instruction to an operation of the second block 200. The second block 200 multiples a control signal with a second carrier signal, and transmits it to the first block 100 from the second block 200.

Moreover, the foregoing state of FIG. 2A is obtained after the supply of power is made with respect to the television apparatus. Or, the state is obtained when a signal from the external connection device (e.g., game console, storage medium player) 300 is directly input to the first block 100 via the HDMI 301 and switch 302 (see FIG. 1). The user plays a game while viewing an image on the display device 500 after the game console is connected. In this case, it is preferable that an image signal from the first block 100 is directly converted to a display signal, and then, input to the display device 500.

If the route of an image signal becomes long, a time delay occurs. This is a factor of causing a problem that a time lag occurs between the key operation for playing a game and a change of an image on the display device 500. In order to solve the foregoing problem, preferably, an image signal from the first block 100 is directly converted to a display signal, and then, input to the display device 500. In addition, this serves to reduce power consumption. FIG. 2B shows a screen on the display device 500 when the network mode specifying key 401 is operated as described above and a traveling state of a return stream.

As described in FIGS. 2B and 2C, a video image of the content corresponding to the selected menu image is displayed on the whole of the screen. In this case, the background is a video image from the receiving block 101, and a video image from a network may be overlapped with a part of the foregoing background video image. In addition, the foregoing network video image may be optionally enlarged and reduced.

FIG. 3A shows a state which is a video image of a content corresponding to a selected menu image is displayed on the whole of the screen. FIG. 3B shows a state which is a network video image is optionally enlarged and reduced so that a network video image is displayed on the left half of the screen while a television video image is display on the right half thereof.

FIG. 4 is a view showing a classification of an operating mode of a television apparatus according to this embodiment. Power-on of a television apparatus, boot time or update time is simply a single mode, and the controller 113 of the first block 100 is mainly operated. As described in FIG. 2A, when the television apparatus is used in a state that an external connection device such as a game console is connected thereto, the apparatus is operated in a TV function mode. Moreover, in a state that the TV mode specifying key 402 is operated, viewing moving picture content and news video image from the wireless LAN module 104 is classified as the TV function mode. Operating the network mode specifying key 401 is classified as a network function mode.

Figure 5A:
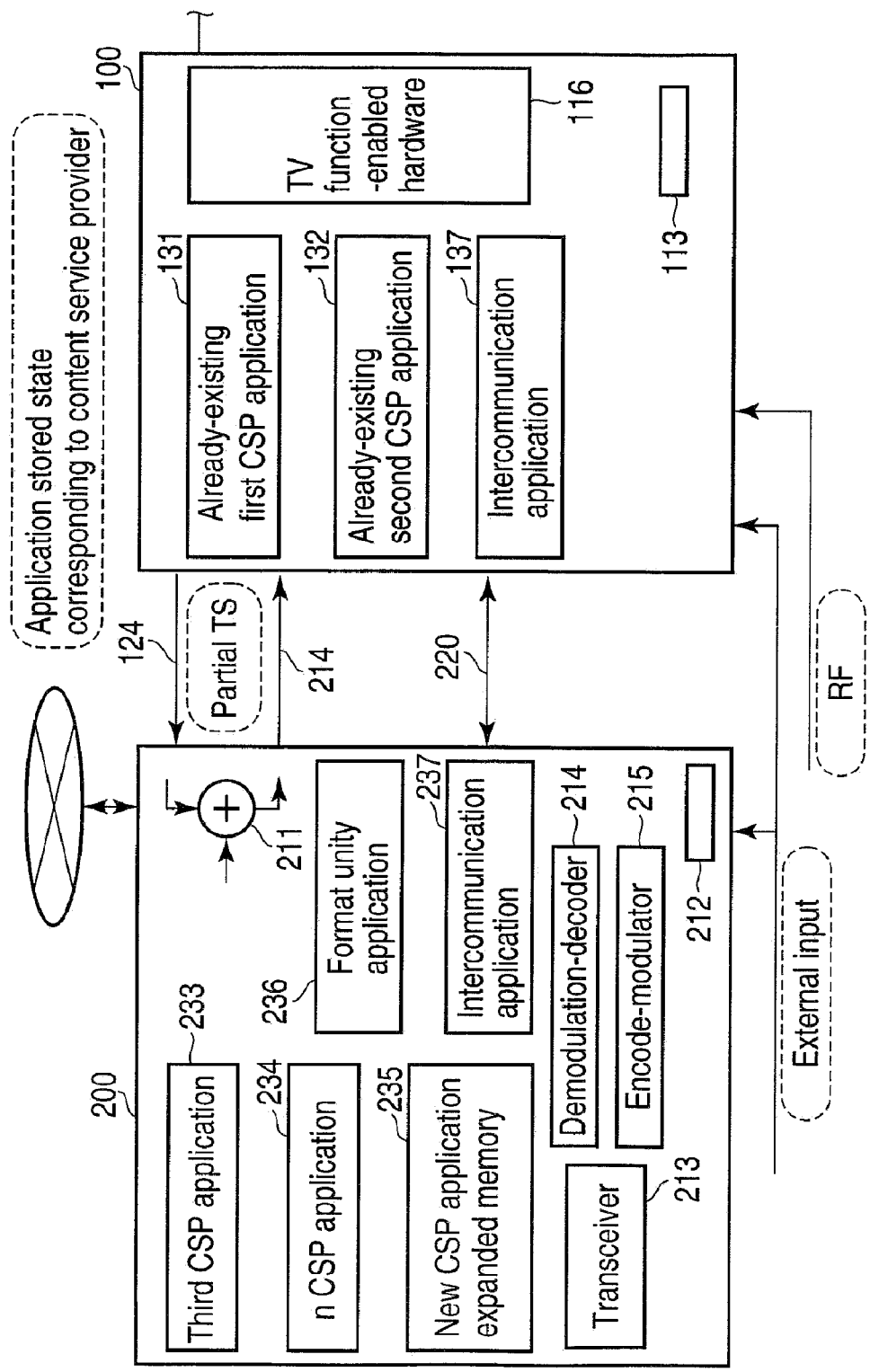
FIG. 5A is a view showing a classification of application and hardware in first and second blocks.

FIG. 5A shows each CSP application (original applications for decoding/converting/displaying data from each content service provider) included in first and second blocks 100 and 200. Already-existing first and second CSP applications 131 and 132 are already included in the first block. In the first block 100, most of the ratio is occupied by television function-enabled hardware 116. Most of the software load of the controller 113 relates to the control of the foregoing television function-enabled hardware 116.

On the other hand, the second block 200 includes many CSPs, that is, third to n CSP applications 233 and 234. Further, the second block 200 includes a new CSP application expanded memory 235 for processing content from a new CSP.

Furthermore, the second block 200 includes a format unity application 236. The format unity application 236 is provided for achieving the following purpose. Specifically, a resolution, aspect ratio or basic format is different between an image signal (first image signal) from the first block 100 and an image signal (second image signal) acquired by the second block 200 via the Internet. For this reason, each format of the foregoing both image signals is unified to easily perform multiplexing. Basically, the format of the second image signal is unified to the format of the first image signal.

First and second blocks 100 and 200 are provided with intercommunication applications 137 and 237, respectively. These intercommunication applications 137 and 237 are used for transmission and analysis of a control signal between first and second blocks.

A transceiver 213, a demodulation-decoder 214, and an encode-modulator 215 are included as hardware of the second block 200. Therefore, the hardware scale of the second block 200 is smaller than that of the first block. The foregoing demodulation-decoder 214 and encode-modulator 215 may be built up by means of software.

FIG. 5B shows the priority given to applications in a state that applications of the first block 100 take the initiative and in a state that applications of the second block 200 take the initiative. In a state that applications of the first block 100 take the initiative (i.e., TV mode specifying key 402 is operated), basic applications managed in the first block 100 are operated. Then a video and graphics application and application 131 or 132 for CSP 1 or 2 have high priority. Moreover, in a state that applications of the second block 200 take the initiative (i.e., network mode specifying key 401 is operated), basic applications managed in the first block 100 are operated. Then a video and graphics application and applications 233 and 234 for CSP 3 to CSPn have high priority.

FIG. 6 shows hardware included in first and second blocks 100 and 200 and the configuration of a controller. In the first block 100, a decoder 121, a transport stream processor 122, a switch 123, a video processor 124, a partial transport stream processor 127, an interface 128 and a display signal output unit 126 are included in the converter 111 of FIG. 1. In the second block 200, a demodulator-decoder 214, an encoder-modulator 215, a signal processor 223 and an interface 224 are included in the processor 211 of FIG. 1.

A transport stream of a channel received by the receiving block 101 (there is the case where the stream is plural) is input to the decoder 121 so that each stream is decoded. A transport stream selected for viewing is input to the switch 123 and the partial transport stream processor 127.

In a TV function mode, the switch 123 is closed, and a transport stream to be viewed is processed by the video processor 125, and then, converted to a base-band image signal. The video processor 125 selectively executes an image quality control, color control and conversion of the number of pixels. Further, the video processor 125 executes a level control and conversion of the number of lines for the output to a display device.

In a network function mode, the switch is opened, and a transport stream to be viewed is transmitted to the second block 200 via the partial transport stream processor 127 and the interface 128. The transmitted transport stream is input to the signal processor 223 via the bypass route 124 and the interface 224. In this case, an image signal of the transport stream is decoded, and thereafter, synthesized with a menu image or an image signal from a network. The synthesized image signal is adjusted as a return stream by the interface 224, and then, returned to the first block 100 via the return route 214. The return stream is input to the video processor 125 via the interface 128, and then, converted to a base-band image signal. The video processor 125 selectively executes an image quality control, color control and conversion of the number of pixels. Further, the video processor 125 executes a level control and conversion of the number of lines for the output to a display device.

Controllers 113 and 212 of first and second blocks 100 and 200 mutually make an exchange of a control signal via a control signal route 220. These controllers 113 and 212 include application managers 130 and 230 for managing applications as shown in FIGS. 5A and 5B, respectively. Moreover, an operation signal from the remote controller 400 is acquired by the operation signal receiver 112, and then, supplied to the controller 113. The controller 113 analyzes the content of the operation signal, and thereafter, reflects an operation of the first block 100 to the operation signal if the analyzed signal is an operation signal related to the control of the first block 100. However, the foregoing operation signal does not relate to the control of the first block 100, but includes the control of the second block 200.

In formation related to the control of the second block 200 is processed as follows. First, in a network function mode, a conversion table of a remote controller operation signal processor 133 is referred. In the conversion table, an operation code used for an application, which is currently operated, is described therein. Further, a remote controller operation key code corresponding to the foregoing operation code is described.

The table including the foregoing codes is transmitted from the second block 200. The second block 200 includes a demodulation-decoder 214 and an encode-modulator 215. Further, the second block 200 includes a signal processor 223 and an interface 224. The controller 212 includes an application manager 230 for managing applications described in FIG. 5A. Further, the controller 212 includes a key code processor 233, which associates a necessary operation code with a remote controller operation code in accordance with each application to create a conversion table.

When a CSP application is operated, the key code processor 233 describes an operation code (referred to as application operating code) required for the application on each row of the first column of the conversion table. Further, the unit 233 describes a remote controller key code corresponding to the application operating code on each row of the second column of the conversion table. The foregoing table creating application may be previously transmitted from a content provider. Or, the table creating application may be previously installed in the second block 200 by a maker, who produces a television apparatus, or may be updated by service using the Internet.

A table created by the key code processor 233 is notified to the first block 100 as a conversion table. Then, the first block 100 stores the conversion table in the operation signal processor 133. When an operation from the remote controller 400 is made, the first block 100 converts a remote controller key code to an application operating code using the conversion table, and then, transfers it to the second block.

In this way, the operation from the remote controller 400 is effectively transmitted to the second block 200.

Figure 7A:
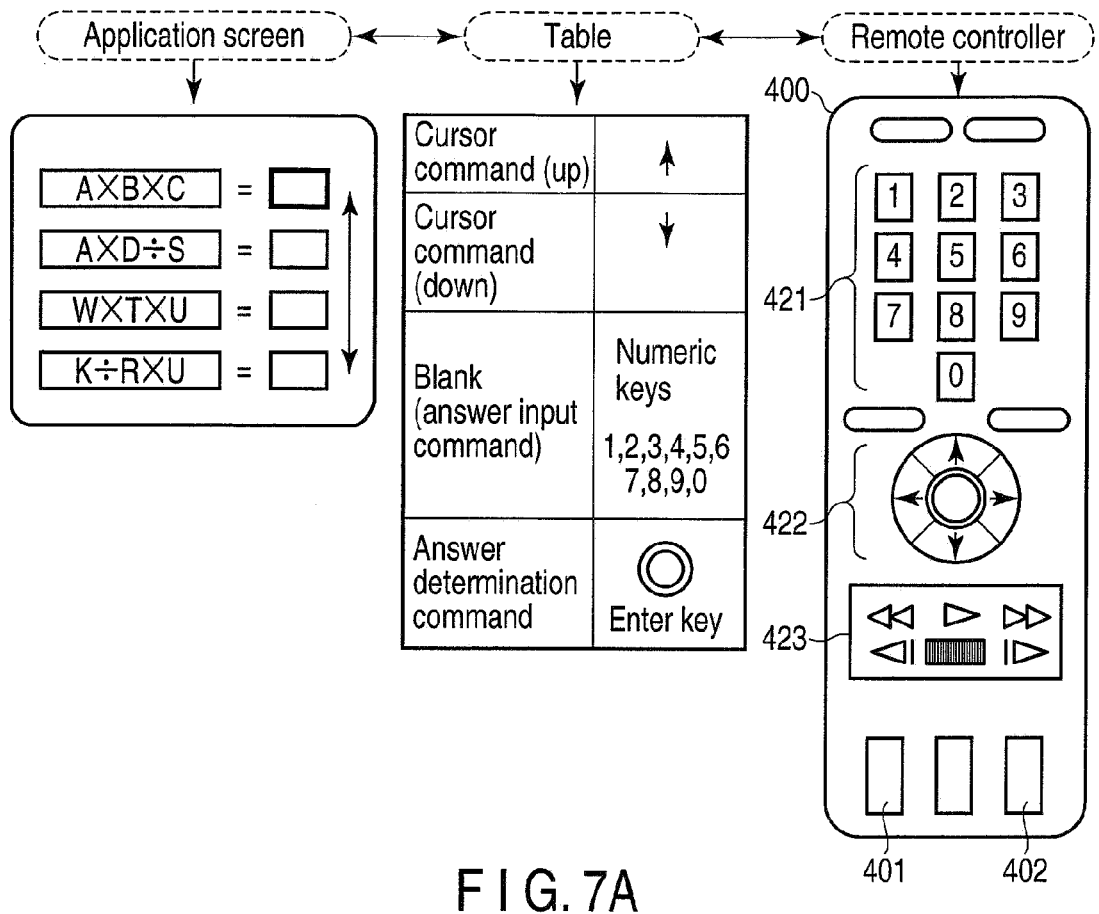
FIG. 7A is an exemplary view showing a state when a conversion table of an operation signal is built up between first and second blocks.

FIG. 7A is a view to explain the case where a CSP application is an application, which makes a question. A screen 551 by a CSP application is displayed on a display device 500. Then, the user operates the remote controller 400 to describe an answer in blanks 561 to 564. A cursor key is used in order to select a blank. On the screen 511, the cursor is moved up and down only. Therefore, the cursor and determination key 422 of the remote controller 400 up, and down operation keys, are used as the foregoing cursor operation. A numeric keypad (1 to 9, 0) 421 of the remote controller 400 is used to specify an answer. The numeric keypad is used for channel selection in a TV function mode. Further, the enter key is used as an operation key for confirming an answer after the answer is input.

Besides, an operation key 423 of a recording/reproducing apparatus of a recording medium is usually used for the following case. For example, one is the case where the user re-corrects an answer, and proceeds to another question for selecting a question (or high level question). Or, the other is the case where the user returns to the previously answered question (or low level question).

Figure 7B:
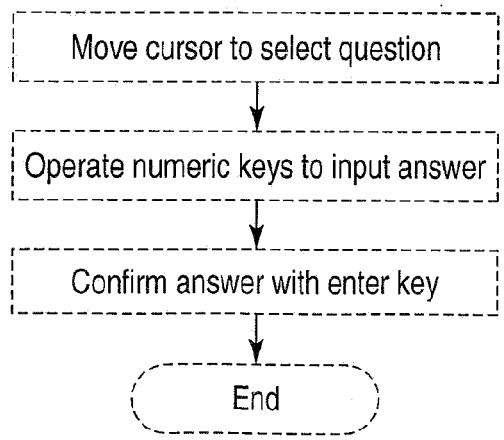
FIG. 7B is an exemplary view to explain an operation for making a response to an application, which is operated in the second block by means of a remote controller using a conversion table.

FIG. 7B is a flowchart when the user makes an answer to the foregoing question. The user selects a blank for inputting an answer to a question using a cursor, and then, inputs an answer by operating a numeric keypad, and thereafter, operates an enter key.

Some embodiments of the present invention have been described. In this case, these embodiments are suggested as an example, and it is not a purpose to limit the scope of the invention. These novel embodiments are realizable according to other various embodiments; in this case, various omissions, replacements and changes are made without departing the subject matter of the invention. These embodiments and its modifications are included in the scope and subject matter of the invention, and included in the scope equal to the invention described in claims.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A television apparatus comprising:
a first block connected to a receiving block for a television signal, wherein the first block comprises a semiconductor integrated circuit, and includes a video processor configured to process an image quality of an image signal contained in an input stream, for obtaining an output adapted to a display;
a second block configured to connect to the first block via each other's interfaces, and to have a network connector, wherein the second block obtains a network image signal by decoding contents acquired via the network;
a bypass route configured to lead a bypass stream, the bypass stream including an image signal, from the first block to the second block via the interfaces;
a processor configured to generate a return stream by inserting the network image signal from the network into the image signal on the bypass stream, at the second block;
a return pass configured to return the return stream via the interfaces, wherein the return stream is the input stream to the first block; and
an output unit provided in the first block, configured to output the image signal which is processed its image quality at the video processor.

2. The television apparatus of claim 1, further comprising:
an operation signal receiver configured to receive an operation signal at the first block; and
a control signal route between the first and second blocks, the control signal route configured to transmit a first carrier conveying an operating signal from the first block to the second block, wherein
the processor executes the insertion of the image signal from the network to the image signal from the bypass route when the operation signal is a first command and stops the insertion based on an input of a second command.

3. The television apparatus of claim 1, wherein the first block further has a switch, the first block is selectively switched into a TV function mode and a network function mode by the switch, a transport stream obtained via the receiving block for the television signal is directly supplied to the video processor in the TV function mode, and the transport stream obtained via the receiving block for the television signal is outputted for the bypass stream in the network function mode.

4. The television apparatus of claim 3, wherein the first carrier includes format data of the image signal on the bypass stream, and the processor executes the insertion according to the format data to maintain the format of the image signal.

5. The television apparatus of claim 4, further comprising:
an operation signal receiver configured to receive an operation signal at the first block; and
a control signal route between the first and second blocks, the control signal route configured to transmit a first carrier conveying an operating signal from the first block to the second block, and the control signal route configured to transmit a second carrier conveying a control signal from the second block to the first block, wherein the processor executes the insertion of the network image signal from the network to the first image signal when the operation signal is a first command and stops the insertion when a second command is input.

6. The television apparatus of claim 5, wherein the first command includes format data of the first image signal, and the processor executes the insertion according to the format data to maintain the format of the first image signal.

7. A television apparatus comprising:
a first block selectively connected to a receiving block for television signal and a wireless network, wherein the first block is configured by a semiconductor integrated circuit, and includes a video processor configured to process an image quality of an image signal contained in an input stream, for obtaining an output adapted to a display;
a second block connected to the first block via an interface and to an input selection switch, the input selecting switch connecting the second block to a wired network, wherein the second block obtains a network image signal by decoding contents acquired via the input selection switch;
a first bypass route configured to lead a first bypass stream from the first block to the second block via the interface, the first bypass stream including a first image signal acquired by the receiving block;
a second bypass route configured to lead a second bypass stream from the first block to the second block, the second bypass stream including contents acquired by the wireless network via the input selection switch in a selected state of the second bypass stream;
a processor configured to generate a return stream by inserting the network image final decoded at the second block into the first image signal included in the first bypass stream, at the second block;
a return pass configured to return the return stream to the first block via the interface, the return stream being the input stream of the first block; and
an output unit provided in the first block, configured to output the image signal which is processed its image quality at the video processor.

8. A television apparatus comprising:
a first block connected to a receiving block for a television signal, wherein the first block is configured by a semiconductor integrated circuit, and includes a video processor configured to process an image quality of an image signal contained in an input stream, for obtaining an output adapted to a display;
a second block configured to connect to the first block via each other's interfaces, and to have a network connector, wherein the second block obtains a network image signal by decoding contents acquired via the network;
a bypass route configured to lead a bypass stream via the interfaces, the bypass stream including an image signal, from the first block to the second block;
a processor configured to generate a return stream by inserting the network image signal from the network into the image signal on the bypass stream, at the second block;
a return pass configured to return the return stream to the first block via the interfaces, the return stream being the input stream of the first block;
output unit provided in the first block, configured to output the image signal which is processed its image quality at the video processor;
a converter configured to convert the image signal included in the return stream into a signal for output and display, at the first block;
an operation signal receiver configured to receive an operation signal at the first block;

a control signal route provided between the first and second blocks, the control signal route configured to transmit a first carrier conveying an operating signal from the first block to the second block, the control signal route further configured to transmit a second carrier conveying a control signal from the second block to the first block;

a key code processor in the second block, the key code processor configured to notify an operation code used for an application operated in the second block and a remote controller operation key code corresponding to the operation code to the first block as a conversion table; and an operation signal processor provided in the first block, configured to convert a remote controller operation key code using the notified conversion table, and to transfer the converted code to the second block.

9. The television apparatus of claim 8, wherein the first carrier signal includes format data of the image signal and wherein the processor maintains the format of the image signal by inserting the image signal according to the format data.

* * * * *